…

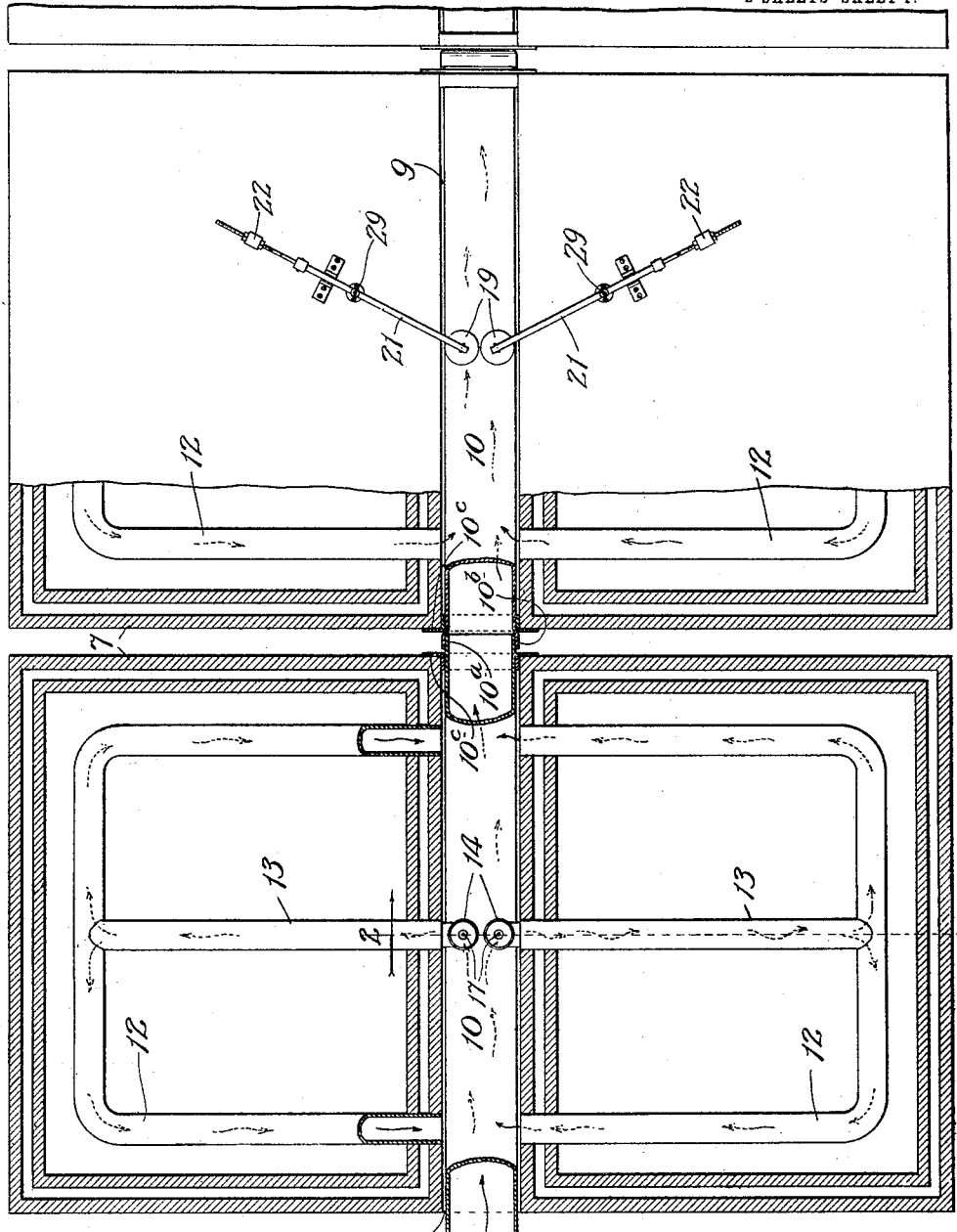

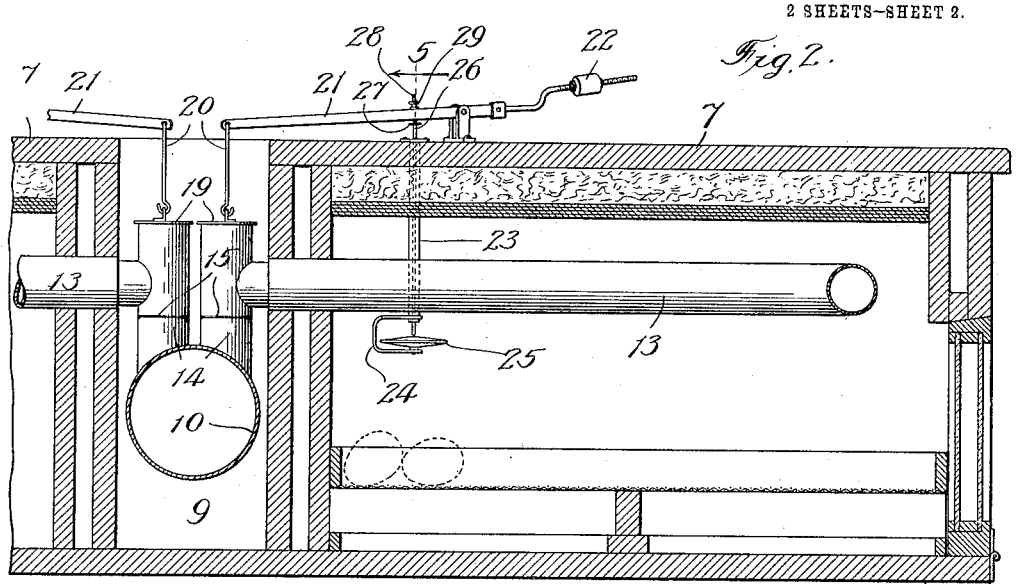
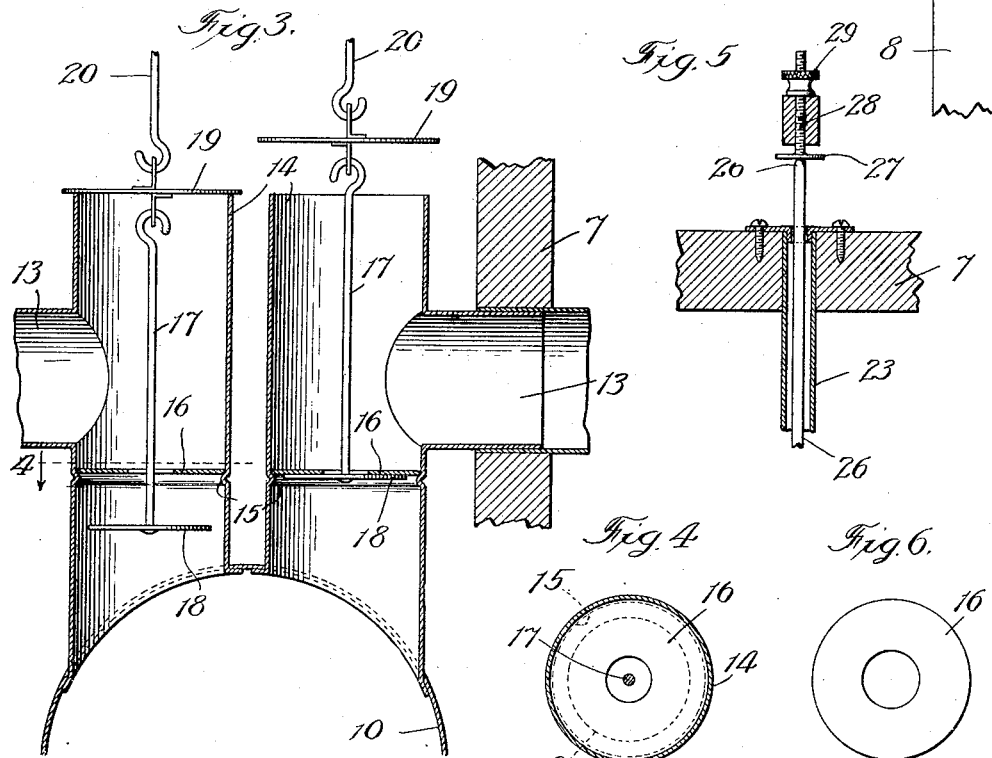

UNITED STATES PATENT OFFICE.

WILLIAM SCHWALGE, OF ELMHURST, ILLINOIS.

INCUBATOR.

1,114,297.  Specification of Letters Patent.  Patented Oct. 20, 1914.

Application filed April 1, 1914. Serial No. 828,763.

*To all whom it may concern:*

Be it known that I, WILLIAM SCHWALGE, a citizen of the United States, residing at Elmhurst, in the county of Dupage and State of Illinois, have invented a new and useful Improvement in Incubators, of which the following is a specification.

My invention relates to an improvement in egg-hatching incubators.

Where a plurality of incubators are employed in a battery and all are heated by hot air from a heater at one end of the series, difficulty is experienced in supplying the heat with required uniformity to all the incubators, particularly as they are added to the series.

The primary object of my invention is to provide means for so regulating the supply of hot air as to insure uniformly heating all of the incubator-chambers throughout the series, however many of the incubators may be added from time to time.

A further object is to provide means for automatically shutting off the supply of heat from any incubator whenever it approaches excess; and another object is to provide means for facilitating the coupling of each incubator to the one preceding it, in forming or adding to the battery.

In the accompanying drawings, Figure 1 shows, by a broken plan view, partly in section, a battery of three incubators embodying my improvements; Fig. 2 is an enlarged broken section on line 2, Fig. 1, but showing the vent-flues in elevation; Fig. 3 is a view on a still larger scale, of part of the showing of Fig. 2, illustrating the vent-flues in section; Fig. 4 is a section on line 4, Fig. 3; Fig. 5 is an enlarged section on line 5, Fig. 2, and Fig. 6 is a plan view of one of the annular plates or disks used in the vent-flues for regulating the supply of hot air to the incubator-chambers.

The incubators 7 are all of the same construction, so that description of one will suffice for all; though each shown is old and well-known in its general construction. It involves a double-walled box-like structure supported on corner-legs, one of which is shown at 8 in Fig. 2, and is divided into two compartments separated by an intermediate space 9 open to the outer air and containing the heat-conduit 10, to one end of which is attached a heater 11 (usually an oil-burning lamp) for heating air admitted into the conduit, the distal end of which is closed by a removable cap (not shown). In the upper part of each compartment is supported a three-branch pipe 12, the outer branches of which extend through the inner wall of the compartment and open into the space 9, thus to the outer air, while the intermediate branch 13 communicates at its end passing through the inner compartment-wall, with a flue 14 rising from the conduit 10 and normally closed at its upper end. The heated air entering the conduit 10 passes upwardly into the flues 14 and thence into the branches 13, coursing through the three pipe branches, which radiate the heat into the compartments; and the spent air discharges from the side-branches into the space 9, all in a known manner.

When only a single incubator is used, the predetermined temperature may easily be controlled at the lamp 11 by properly adjusting the flame. On adding another similar incubator, however, the intensity of the heat must be increased, as by raising the lamp-wick to augment the flame for supplying enough heat for both incubators to heat them uniformly. The tendency is for the greater amount of heat to enter the first incubator and thereby heat it excessively, and to rob the second incubator and thus heat it inadequately. This tendency obviously increases with each added incubator, of which as many as ten or more may be used in a battery; and with each addition the heat requires regulation to distribute it uniformly throughout all of the incubator-chambers, for which purpose I have devised my improvement hereinafter described.

To facilitate coupling an added incubator to the one preceding it in a manner to cause all to communicate through a common conduit 10, the distal end 10ª of the conduit-section in each, provided with the aforesaid cap, and which protrudes through the end-wall of the incubator and is surrounded by a thimble 10ᶜ, is of the same diameter as the general diameter of the conduit-section, and the adjacent end 10ᵇ of the conduit-section protruding through the opposing wall of the next incubator, and likewise surrounded by a thimble 10ᶜ, is expanded to telescope, on removal of the cap, the end 10ª. This manner of producing the coupling is simple and provides a joint adequately tight against leakage of the heated air, because the direction of overlapping of one conduit-end by the other is opposite that of the flow of the air.

In each flue 14 is provided, below the bottom of the pipe 13 connected with it, a seat 15, which may be formed by crimping the flue inwardly. On each seat is supported an annular metal disk 16 of a diameter to fit more or less accurately the bore of the flue. With a single incubator in use, the diameter of the central opening in each plate or washer-like disk seated in a flue is such as to admit through it from the conduit the amount of hot air for the proper heating of the incubator-compartments. Upon adding a second incubator, coupled in the manner described, the disks in the flues of the first incubator are taken out and others with suitably smaller openings are substituted, while disks having openings of relatively larger diameter are seated in the flues of the second incubator. Each time an incubator is added, it is provided in its flues with these disks with openings of proper size, and those in the flues of the other incubators have other disks substituted with relatively-proportioned openings of suitably smaller sizes to insure the introduction into all the incubators in the battery of the proper uniform heat. In this way the supply of heat practically enters simultaneously all the incubators in the series, however long the latter may be.

To guard against accidental overheating of any incubator, I provide on each thermostatically-controlled valve-mechanism described as follows: In each flue a rod 17 extends through the seat 16 and carries on its lower end a valve 18 to seat upwardly against the under side of the disk and close the opening in the latter, which is the condition of the disk in one of the two flues illustrated in Fig. 3, thereby to shut off the ingress of heated air into that flue. Another valve 19, adapted to seat on and close the flue at its upper end, when the valve 18 is open, has a hook-connection with the rod 17 and is flexibly suspended on the hooked end of a link 20 depending from a lever 21 fulcrumed between its ends on the top of the incubator and provided with an adjustable weight 22 on its rear end. Into each incubator-compartment depends vertically from its top a metal tube 23, carrying on its lower end a bracket 24 in which is supported a thermostat 25, that shown being of the well-known wafer variety containing a fluid, such as ether, readily expansible and contractible under variations in temperature. A rod 26 depends through the tube to bear its lower end centrally against the wafer and its upper end against a disk 27 on the lower end of a threaded rod 28 working in the lever and carrying a nut 29. The adjustment is such as to cause the normal position of the lever to seat the valve 19 and open the valve 18, with the rod 26 always in contact at its opposite ends respectively with the wafer and the disk. If then, for any reason, the temperature in an incubator-compartment becomes excessive, expansion of the thermostat will cause the rod 26 to turn the lever on its fulcrum and thereby close the valve 18 to shut off the supply of hot air and open the valve 19 to permit the escape of the heat from the compartment to the outer air. With the cooling down of the compartment to the predetermined temperature, the resultant contraction of the thermostat will, as is apparent, effect reseating of the valve 19 and opening of the valve 18. This shutting off the supply of heat to any compartment does not, however, continue sufficiently long to cause the temperature in the other compartment or incubators to be injuriously augmented.

As will be seen, the construction shown of the thermostatically-controlled valves enables the disk in any flue to be withdrawn by removing the valve 19 and withdrawing the rod 17 whereby the valve 18 thereon carries the disk with it; and a new disk may be inserted into place with equal facility.

The opening in each disk shown in Fig. 3 is of one size, while that in the disk of Fig. 6 is of relatively larger diameter. These variations are only illustrated by way of example, however; and it will be understood that each user of my improved incubator will be supplied with a plurality of disks having openings of different diameters to enable him to apply my improvement in the manner herein explained.

What I claim as new and desire to secure by Letters Patent is:

A plurality of incubators, each provided with a section of hot-air conduit and coupled together at the conduit-sections to form a battery having a common hot-air conduit, an air-heater on one end of said conduit, a flue for each incubator branching from said conduit, pipes in the incubators branching from the flues and communicating with the outer air, and plates removably seated in the flues and having openings through which the supply of heated air from the conduit enters said pipes through the flues, the openings in the plates in the flues of successive incubators increasing progressively in size from the heater-end to the opposite end of the battery, for the purpose set forth.

WILLIAM SCHWALGE.

In presence of—
   D. C. Thorsen,
   A. C. Fischer.